E. L. MORRIS.
SAFETY DRIVING MIRROR FOR AUTOMOBILES.
APPLICATION FILED DEC. 17, 1921.
1,416,966.
Patented May 23, 1922.
2 SHEETS—SHEET 1.
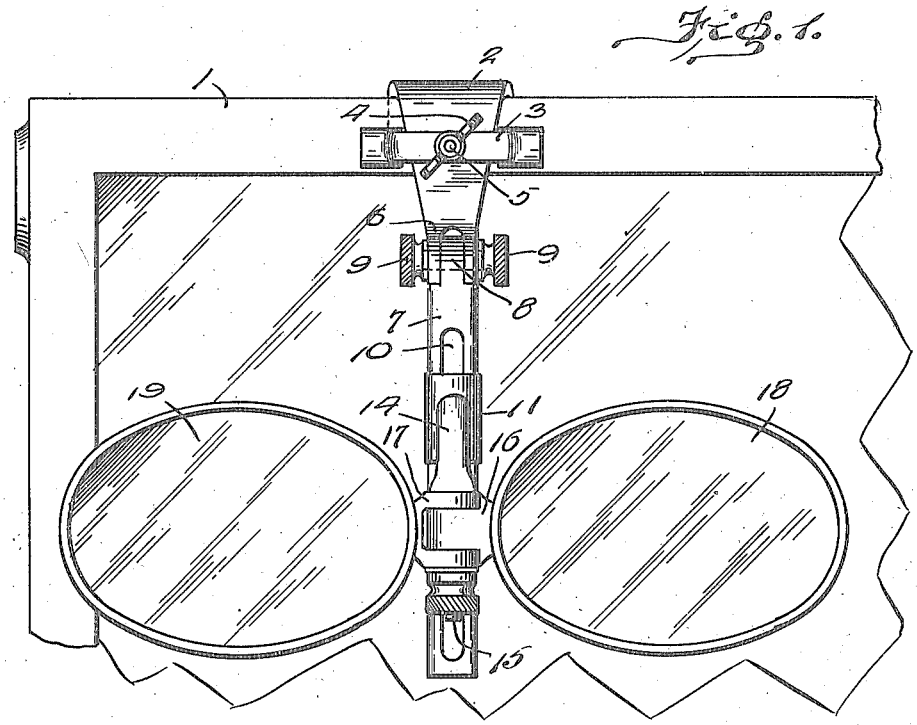
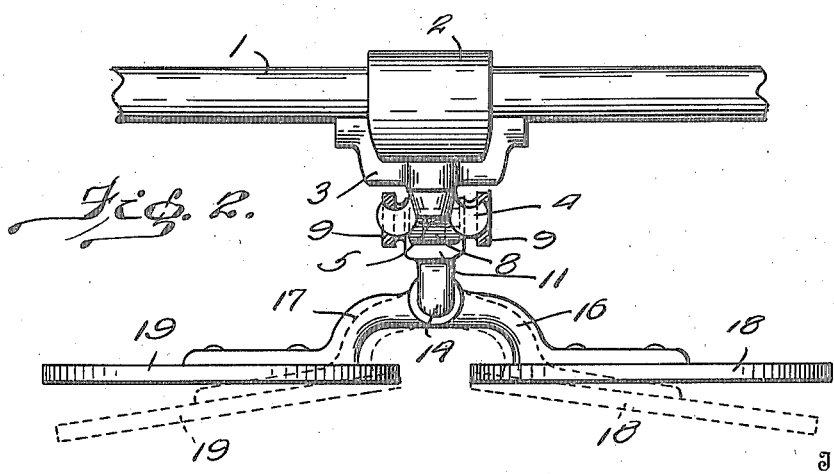
Inventor
Edgar L. Morris,
By Lester L. Sargent.
Attorney

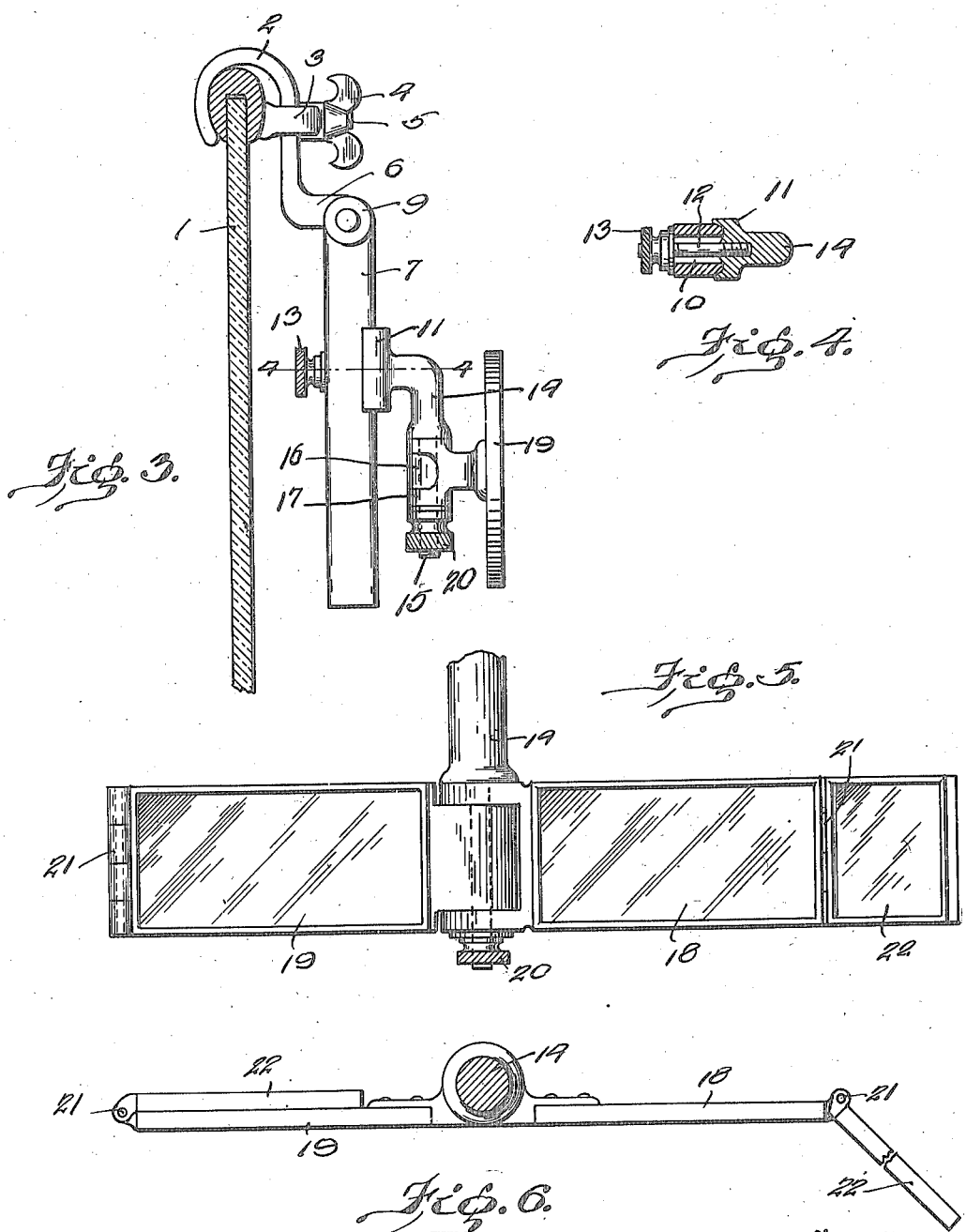

UNITED STATES PATENT OFFICE.

EDGAR LESLEY MORRIS, OF CHARLOTTE, NORTH CAROLINA.

SAFETY DRIVING MIRROR FOR AUTOMOBILES.

1,416,966.  Specification of Letters Patent.  Patented May 23, 1922.

Application filed December 17, 1921. Serial No. 523,048.

*To all whom it may concern:*

Be it known that I, EDGAR LESLEY MORRIS, a citizen of the United States, residing at Charlotte, in the county of Mecklenburg and State of North Carolina, have invented a new and useful Safety Driving Mirror for Automobiles, of which the following is a specification.

The object of my invention is to provide a novel driving mirror designed to be used on the windshield of an automobile and so arranged that it can be adjusted to afford the driver a view of objects behind him on both the left and the right and sides; and also to provide a type of mirror which can be used with a closed car as it hangs on the windshield inside the car and objects are reflected on the mirror through the opening in the curtain in the rear of the car. It is also an object of my invention to provide a device having mirrors that are adjustable vertically relative to the supporting apparatus to permit of adjustment of the mirrors to the height of the driver; to provide mirrors that can be tilted to any angle desired; and to provide the novel combination of mirrors disclosed in the accompanying drawings. I attain these and other objects by the mechanism illustrated in the accompanying drawings, in which—

Figure 1 is a front elevation of my invention applied to the windshield of an automobile:

Fig. 2 is a top plan of same;

Fig. 3 is a side elevation of the device applied to a windshield, the latter being shown in section;

Fig. 4 is a horizontal section on line 4—4 of Fig. 3;

Fig. 5 is a front plan of a modified form of the invention; and

Fig. 6 is a top plan of the form shown in Fig. 5.

Like numerals designate like parts in each of the several views.

Referring to the accompanying drawings, I provide a hook 2 which engages over the top of the windshield 1 and is releasably secured to same by clamp 3 and wing nut 4 which latter member is threaded on the screw stud 5. Hook 2 is provided with a right angularly bent portion 6 from which depends the bar 7 which is engaged on the hook 2 by hinge 8 and thumb set screws 9. Bar 7 is provided with a longitudinal slot 10 in which the clamping head 11 is slidably secured by means of screw stud 12, as shown in Fig. 4, and thumb nut 13. Clamping head 11 has a depending portion 14 on which brackets 16 and 17 of mirror frames 18 and 19, respectively, are adjustably supported. The depending member or rod 14 is provided with a screw threaded shaft 15 on which is mounted the thumb nut 20 which is operated to loosen the brackets 16 and 17 and permit of a radial adjustment.

Referring to Fig. 5, I may provide any suitable shape of mirrors 18 and 19 and also provide a suitable extension mirror 22 on mirrors 18 and 19 adjustably attached to same by suitable hinges 21. These two extra mirrors 22 can be folded back, as shown in Figs. 5 and 6, when not in use; and also may be turned to different angles relative to the main mirrors 18 and 19 to which they are hingedly attached.

In operating the device the hook 2 is engaged over the windshield and usually at the center of same and clamped there by the wing nut 4. The clamping head 11 is raised or lowered to the desired position relative to bar 7 and secured in the desired position by thumb nut 13. Thumb nut 20 on screw threaded shank 15 of depending member 14 is loosened to permit of radial adjustment of mirrors 18 and 19 to the desired angle—usually tilted slightly toward each other—and the thumb screw tightened to hold them in the desired position.

If the form of the mirrors shown in Figs. 5 and 6 is employed the extension mirrors 22 may be either moved to any desired angular position relative to the main mirrors 18 and 19, or may be folded back, as shown in Fig. 6.

It is of course understood that I may employ any suitable means for adjusting the adjustable parts of the apparatus and may utilize any suitable joint between members 6 and 7, the preferred construction, however, being illustrated in the drawings.

What I claim is—

1. In a device of the class described, the combination of clamping means detachably engageable over the windshield of an automobile, a depending bar hingedly secured to said element, a second rearwardly projecting depending element mounted on and vertically adjustable relative to the first mentioned depending bar, a plurality of mirrors swingably supported on the latter element, and means for manually securing and fastening the mirrors in any desired adjusted position.

2. In a device of the class described, the combination of clamping means detachably engageable over the windshield of an automobile, a depending slotted bar hingedly secured to said element, means for securing said bar in an adjusted position relative to the clamping means, a second depending element mounted on and vertically adjustable relative to the first mentioned depending bar and a plurality of mirrors swingably supported from the latter element.

3. In a device of the class described, the combination of a hook engageable over the top of a windshield, said hook having a right angularly bent portion, means for detachably clamping the hook to the top of the windshield, a depending bar adjustably secured to the angularly bent portion of the hook, mirror supporting means vertically adjustable on the depending bar, a plurality of mirrors laterally swingable from said means, and means for fastening the mirrors in the desired adjusted position.

EDGAR LESLEY MORRIS.